Figure 1:
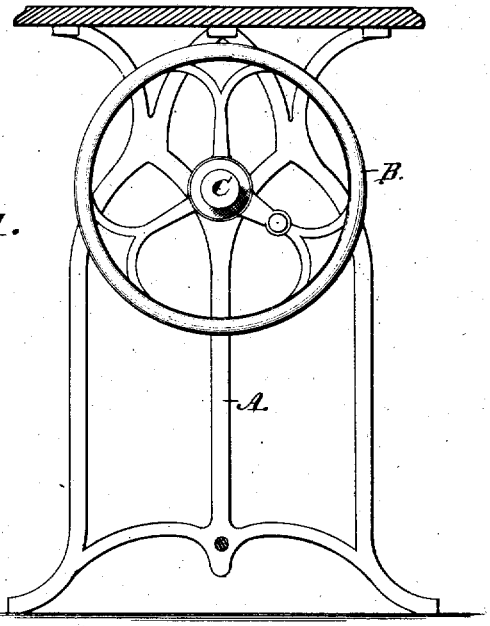

P. L. REESE.

Anti-Rattling Journal for Balance-Wheels of Sewing-Machines.

No. 6,284. Reissued Feb. 9, 1875.

Attest:

A. H. Norris.

Jos. L. Crombe

Inventor.

Philip L. Reese.

By James L. Norris.

Atty.

UNITED STATES PATENT OFFICE.

PHILIP L. REESE, OF MOUNT STERLING, KY., ASSIGNOR TO THE VICTOR SEWING-MACHINE COMPANY, OF MIDDLETOWN, CONN.

IMPROVEMENT IN ANTI-RATTLING JOURNALS FOR BALANCE-WHEELS OF SEWING-MACHINES.

Specification forming part of Letters Patent No. 124,160, dated February 27, 1872; reissue No. 6,284, dated February 9, 1875; application filed January 9, 1875.

*To all whom it may concern:*

Be it known that I, PHILIP L. REESE, of Mount Sterling, Montgomery county, Kentucky, have invented certain Improvements in Anti-Rattling Journals for the Balance-Wheels of Sewing-Machines, of which the following is a specification:

My invention relates to certain improvements in journals for the balance-wheels of sewing-machines, jewelers' lathes, and the like. In this class of machines it has been found desirable to arrange a heavy driving or balance wheel upon a short fixed journal, instead of securing it upon a long shaft having bearings at its ends, as is commonly practiced, as such a shaft would be in the way of the limbs of the operator, and would soil and injure the clothing. It has been found difficult to accomplish this, however, for the reason that a short journal-bearing soon wears loose and allows the wheel to wabble and rattle or slide on the journal, giving the belt a tendency to run off, and causing a disagreeable noise and jar, and seriously interfering with the running of the machine.

The object of my invention is to obviate these defects; and it consists, first, in providing the journal which supports the driving or balance wheel of such machines with a screw-threaded surface to receive a screw-threaded compensating follower or nut having a conical bearing-face, which may be moved back and forth on the journal, a corresponding conical-shaped seat being formed in the hub of the wheel, so that the balance-wheel, instead of bearing directly upon the spindle, as in other constructions, will have its bearing upon the conical follower, which can be advanced along the journal from either end to compensate for any wear that may take place, and form a solid and noiseless journal for the wheel; second, in providing either end of a short fixed journal for the balance-wheels of sewing-machines and the like, with collars or nuts at each end, having conical bearing-faces, either of which may be made to advance along said journal for the purpose of adjusting the same, to compensate for wear and allow the wheel to be adjusted in either direction, substantially as hereinafter described; and third, in providing a short fixed journal for the balance-wheels of sewing and other like machines with conical bearings for said wheels at each end, which may be made to approach each other in order to compensate for wear, the balance-wheel being provided with corresponding conical seats in its hub, substantially as hereinafter described.

Figure 2:
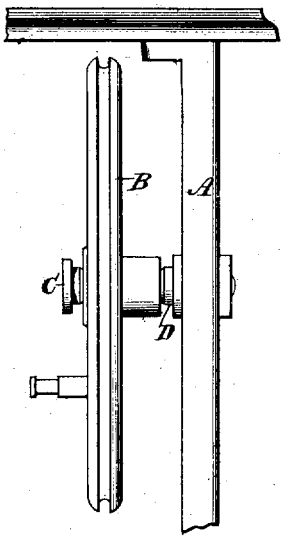
Figure 3:
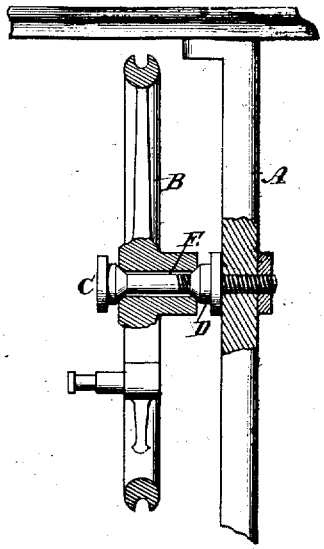
Figure 4:
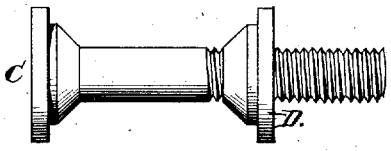
Figure 5:
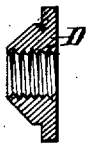

In the drawings, Figure 1 represents a front elevation of a balance-wheel hung on my improved journal. Fig. 2 represents a side elevation of the same. Fig. 3 represents a view of the same, taken longitudinally through the hub and journal. Fig. 4 is side view of the journal, showing the conical bearings, and Fig. 5 is a cross-section of the compensating follower.

A is the frame in which the journal is secured, and B the balance-wheel, constructed as usual, with a crank-pin for the treadle-link and a groove for the belt, if such be desirable. C represents the screw-threaded journal, which is secured to the frame A in any convenient manner, usually by means of a screw-thread and lock-nut on the outer end, by means of which the bolt is made adjustable and can be attached and detached at will. Said journal is provided at either end with a follower-nut, D, having a conical bearing-face, upon which the balance-wheel B revolves, a corresponding conical seat being formed in its hub for the purpose.

The follower D should be screw-threaded, and so arranged upon the journal G, which should likewise be screw-threaded, that it may be advanced toward the wheel in order to compensate for any wear that may occur in the hub of the same. The end of the journal opposite the follower D is provided with a similar conical bearing-face, the hub of the wheel being conically reamed or bored, so as to form a proper seat for the same. The axle-neck or bore F, through the hub of the wheel, is made with a hole of a diameter slightly greater than that of the bolt C, and the ends of this hole are reamed out, as before mentioned, to form the seats for the conical bearings upon the journals.

It will be seen that when the journal G is inserted in the hole or bore, through the hub of the wheel, and the follower-nut is advanced toward said wheel until it is brought to bear against the conical seat in said hub, the wheel will revolve upon the conical bearings instead of upon the journal, and any wear that may take place may be easily compensated by further advancing the follower, enabling the operator to adjust the wheel whenever necessary, so that it will run smoothly and avoid all tendency to wabble. It will be further seen that by this arrangement the bearing can be reduced to a comparatively small surface, as, by the adjustment of the conical follower and journal in one direction, and the nut thereon in the other, I am enabled to bring the conical bearings almost in contact with each other, so that a balance-wheel can be adjusted and set at the desired point on the journal, which is a great desideratum, it being essential that the balance-wheel should be in line with the drive-wheel of the sewing-machine, so as to have the belt run true, and, by such, friction is materially reduced without sacrificing the solid and steady bearing of the wheel obtained in other constructions by the use of a long axle-shaft, or of a journal-bearing of considerable length. In order to secure the follower from working loose, when applied in the desired position, the journal should be provided with a lock-nut, H, by means of which the parts may be clamped together after being adjusted, the same acting as a jam-nut. The journal being screw-threaded, as described, it is evident that the follower or nut may be applied at either end of the journal, but it will be found preferable in practice to apply and advance it over the outer end of the same, in order that the wheel may be readily removed without taking out the entire bolt.

What I claim is—

1. A journal-bearing for balance-wheels of sewing-machines, provided with a compensating screw-threaded follower or nut, having a conical bearing-face adapted to fit into a conical seat in the hub of the wheel, said follower constructed to be advanced along the threaded journal to compensate for lateral and circumferential wear, substantially as described.

2. A screw-threaded journal for the balance-wheels of sewing-machines, provided with followers having conical bearing-faces, either of which may be made to advance along said journal for the purpose of compensating for wear of said wheel upon the bearings, substantially as described.

3. A journal-bearing for the balance-wheels of sewing-machines, provided with followers having conical-bearing faces, either of said followers constructed to approach the other, and fit in a conical-shaped seat formed in the hub of the wheel for compensating for wear, substantially as described.

PHILIP L. REESE.

Witnesses:

HENRY S. WHITE,

S. P. HULL.